US010683983B1

United States Patent
Stowell et al.

(10) Patent No.: US 10,683,983 B1
(45) Date of Patent: *Jun. 16, 2020

(54) TRUCK CAB LIGHT SAFETY LIGHTING DEVICE

(71) Applicant: Martin L. Stowell, Valencia, CA (US)

(72) Inventors: Martin L. Stowell, Valencia, CA (US); Mark Santus, Daytona Beach, FL (US)

(73) Assignee: Martin L. Stowell, Valencia, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/694,393

(22) Filed: Nov. 25, 2019

Related U.S. Application Data (62) Division of application No. 16/370,874, filed on Mar. 29, 2019, now Pat. No. 10,514,146.

(51) Int. Cl.
| | | |
|---|---|---|
| *F21S 43/19* | (2018.01) | |
| *F21S 43/27* | (2018.01) | |
| *F21V 23/00* | (2015.01) | |
| *B60Q 1/30* | (2006.01) | |
| *B60Q 1/44* | (2006.01) | |
| *F21S 43/14* | (2018.01) | |
| *H05B 45/24* | (2020.01) | |
| *F21Y 115/10* | (2016.01) | |

(52) U.S. Cl.
CPC ............ *F21S 43/195* (2018.01); *B60Q 1/302* (2013.01); *B60Q 1/44* (2013.01); *F21S 43/14* (2018.01); *F21S 43/27* (2018.01); *F21V 23/001* (2013.01); *F21V 23/006* (2013.01); *H05B 45/24* (2020.01); *B60Q 2900/10* (2013.01); *F21Y 2115/10* (2016.08)

(58) Field of Classification Search
CPC ........................................................ B60Q 1/44
See application file for complete search history.

(56) References Cited

U.S. PATENT DOCUMENTS

| | | | | |
|---|---|---|---|---|
| 3,105,884 | A * | 10/1963 | Cottrell .................. | B60Q 1/302 200/61.89 |
| 4,591,954 | A * | 5/1986 | Kawamura ............ | B60Q 1/302 340/815.45 |
| 4,891,625 | A | 1/1990 | VanRiper et al. | |
| 5,103,382 | A * | 4/1992 | Kondo .................. | B60Q 1/302 362/249.04 |
| 5,258,893 | A | 11/1993 | Finneyfrock | |
| 5,839,231 | A | 11/1998 | Gebhart et al. | |
| 6,799,873 | B2 | 10/2004 | Fox | |

(Continued)

*Primary Examiner* — Mary Ellen Bowman
(74) *Attorney, Agent, or Firm* — Brian S. Steinberger; Hilary F. Steinberger; Law Offices of Brian S. Steinberger, P.A.

(57) ABSTRACT

Systems, devices, and methods for replacing an existing truck cab braking light with an after-market or retrofit universal elongated light emitting diode (LED) light device which can easily replace existing truck cab rear facing brake lights, and do not require different types of light devices for different trucks, and can be rigidly sealed and seated against the rear of the truck cab with additional fasteners. The replacement light system include three sets of printed circuit boards having LEDS (light emitting diodes) that can be independently operated or operated together, in different colors, such as but not limited to red and white color emissions in various operating conditions.

20 Claims, 12 Drawing Sheets

(56) References Cited

U.S. PATENT DOCUMENTS

| | | | |
|---|---|---|---|
| 7,040,779 B2 * | 5/2006 | Lamke | B60Q 1/2696 362/231 |
| 7,182,386 B2 | 2/2007 | Damian | |
| 7,303,320 B1 | 12/2007 | Ashley | |
| 8,047,691 B2 | 11/2011 | Leese et al. | |
| 8,956,020 B2 * | 2/2015 | Graves | B60Q 1/26 362/459 |
| 9,403,476 B2 | 8/2016 | Hausler et al. | |
| 10,246,006 B1 | 4/2019 | Stowell et al. | |
| 2002/0036908 A1 * | 3/2002 | Pederson | B60Q 1/2611 362/545 |
| 2002/0159270 A1 * | 10/2002 | Lynam | B60K 35/00 362/492 |
| 2004/0227627 A1 | 11/2004 | Li | |
| 2007/0047238 A1 * | 3/2007 | Vukosic | B60Q 1/2611 362/368 |
| 2008/0232129 A1 * | 9/2008 | Lyons | B60Q 1/2611 362/547 |
| 2010/0277903 A1 * | 11/2010 | Bauer | B60Q 1/2696 362/235 |
| 2013/0051059 A1 * | 2/2013 | Abai | B60Q 1/068 362/523 |
| 2014/0287600 A1 | 9/2014 | Graves et al. | |
| 2014/0301101 A1 | 10/2014 | Russ | |
| 2014/0333429 A1 | 11/2014 | De La Rosa et al. | |
| 2016/0052445 A1 | 2/2016 | Huang | |
| 2016/0200241 A1 * | 7/2016 | Snider | B60Q 1/268 296/146.16 |
| 2017/0313244 A1 * | 11/2017 | Luciew | B60Q 3/62 |
| 2018/0118097 A1 * | 5/2018 | Thompson | F21S 4/28 |

\* cited by examiner

TRUCK CAB LIGHT SAFETY LIGHTING DEVICE

RELATED APPLICATION

This application is a divisional patent application of U.S. patent application Ser. No. 16/370,874 filed Mar. 29, 2019, now U.S. Pat. No. 10,514,146, which is incorporated by reference in its' entirety.

FIELD OF INVENTION

This invention relates to truck cab brake lights, and in particular to systems, devices, and methods for replacing an existing truck cab braking light with an after-market or retrofit universal elongated light emitting diode (LED) light device which can easily replace existing truck cab rear facing brake lights, and do not require different types of light devices for different trucks, and can be rigidly sealed and seated against the rear of the truck cab with additional fasteners.

BACKGROUND AND PRIOR ART

Trucks are often used on construction sites to deliver and retrieve supplies and materials, and when stopped often turn off their front and rear lights and brake lights on the rear of their trucks as well as the rear facing brake lights on the upper rear of the truck cabs. A problem occurs that the trucks are not easily visible when stopped when their lights are turned off during these stops. As such, it can be dangerous to others when these trucks are stopped since their visibility can be severely limited, especially in dark locations or during storms, and the like.

Leaving on the truck vehicle's lights on may not be enough to bring attention to the stopped trucks. As such, there is a need to have extra lights for bringing attention to a stopped truck vehicle to increase the visibility of the stopped vehicle as well as for safety reasons.

Additionally, standard vehicle lights are usually limited to be used for breaking, signaling or similar functions, and are not versatile to bring separate attention to a stopped truck vehicle.

Over the years various types of products have been proposed for providing extra lights to truck cab brake lights, but would not be satisfactory as an after-market product. U.S. Pat. No. 8,956,020 to Graves et al. describes an auxiliary lamp mounting adapter assembly for vehicles that include truck cabs. This adapter assembly requires the rear brake light on the rear of the truck cab be removed and the opening in the back of the cab for the existing light being exposed. A new housing having a main opening that generally matches and aligns with the existing opening in the back of the truck cab. The new housing includes auxiliary lights to the right and/or left of the main opening. The removed brake light can be remounted through the main opening in the new housing, and fastened to the cab, without having to use additional fasteners, that can penetrate into the rear cab.

A problem with this adapter assembly is that by using the existing rear brake light with this adapter assembly, the resulting light could appear to be an obvious modification to the existing brake light and not look like original truck equipment.

Another problem is that many different types of adapter assemblies would need to be manufactured for the different U.S. and foreign tucks, since truck cabs do not have identical brake lights on the back of their cabs.

Additionally, the auxiliary lights would require separate wiring that must connect to the existing wiring, and could cause problems if not properly connected.

Still furthermore, by only using the existing brake light fasteners, the longer replacement housing may not be properly sealed and seated against the truck cab, and could vibrate and separate during regular use. The larger replace housings could also cause the existing fasteners loose causing water leaks into the cab.

Thus, the need exists for solutions to the above problems with the prior art.

SUMMARY OF THE INVENTION

A primary objective of the present invention is to provide systems, devices, and methods for replacing an existing truck cab braking light with an after-market or retrofit universal elongated light emitting diode (LED) light device which can easily replace existing truck cab rear facing brake lights, and do not require different types of light devices for different trucks.

A secondary objective of the present invention is to provide systems, devices, and methods for replacing an existing truck cab braking light with an after-market or retrofit elongated light emitting diode (LED) light device which can easily replace existing truck cab rear facing brake lights, and can be rigidly sealed and seated against the rear of the truck cab with additional fasteners.

A third objective of the present invention is to provide a systems, devices, and methods for replacing an existing truck cab braking light with an after-market or retrofit elongated light emitting diode (LED) light device which would look like original equipment and not look like an aftermarket product.

An embodiment of the replacement light system for being attachable to an upper rear facing exterior portion of a truck cab, can include an elongated housing having a length substantially greater than a height, the housing having a front side and a rear side, the housing having housing fastener openings passing from the front side to the rear side of the housing, a light support member having a front side and a rear side, the support member having support fastener openings passing from the front side to the rear side of the support member, a plurality of LEDS (light emitting diodes) equally spaced apart from one another mounted on the front side of the support member, and fasteners for attaching the light system to the upper rear facing exterior portion of the truck cab by attaching the fasteners through the housing fastener openings and the light support member fastener openings.

The replacement light system can further include a wire harness with power cord and control lines extending from the rear side of the light support member for connecting the plurality of LEDs to a vehicle power supply.

The elongated housing can include an additional opening sized to fit over a rearwardly facing printed circuit board on the rear side of the light support member. The additional opening can be offset from a middle portion of the elongated housing.

The replacement light system can further include a harness wire opening sized to receive the power line harness therethrough.

The replacement light system can further include an elongated lens cover sized to fit over the front side of the light support member, the elongated lens cover having lens fastener openings, wherein the fasteners attaches the light system to the upper rear facing exterior portion of the truck cab by attaching the fasteners through the lens fastener openings and the housing fastener openings and the light support member fastener openings.

The fasteners can include: approximately six to approximately ten overall fasteners. Up to approximately six additional fasteners can be drilled into upper rear exterior portion of the truck cab for attaching the replacement light system The support member further can include a left printed circuit board, a center printed circuit board and a right circuit board, each positioned side by side on the front side of the support member for controlling the LEDs mounted to each of the left printed circuit board and the center printed circuit board and the right circuit board.

The replacement light system can include a brake light operation state for only activating the LEDs in a red color on the center printed circuit board, when a truck brake is activated, and a truck bed light operation state for activating all the LEDS in a white color on the left printed circuit board and the center printed circuit board and the right circuit board, when a truck bed light is activated.

The replacement light system can include a weather seal located about a perimeter edge of the rear side of the support member and the upper rear facing exterior portion of the truck cab.

A method of replacing an existing truck light located on an upper rear facing exterior portion of a truck cab with a replacement truck light system, can include the steps of removing the existing truck light located on the upper rear facing exterior portion of the truck cab, providing an elongated housing having a length substantially greater than a height, the housing having a front side and a rear side, the housing having housing fastener openings passing from the front side to the rear side of the housing, providing a light support member having a front side and a rear side, the support member having support fastener openings passing from the front side to the rear side of the support member, providing a plurality of LEDS (light emitting diodes) equally spaced apart from one another mounted on the front side of the support member, providing fasteners, and attaching the replacement light system to the upper rear facing exterior portion of the truck cab by screwing the fasteners through the housing fastener openings and the light support member fastener openings into existing fastener openings in the upper rear facing exterior portion of the truck cab.

The method can include the steps of drilling additional fastener openings into the upper rear facing exterior portion of a truck cab, and attaching the replacement light system to the upper rear facing exterior portion of the truck cab by screwing the fasteners through the housing fastener openings and the light support member fastener openings into the additional fastener openings and existing fastener openings in the upper rear exterior portion of the truck cab.

The drilling step can include drilling between approximately four to approximately six additional fastener openings into the upper rear facing exterior portion of a truck cab. In a preferred embodiment, six additional fastener openings can be drilled into the upper rear facing exterior portion of a truck cab. The method can further include the steps of providing an elongated lens cover sized to fit over the front side of the light support member, the elongated lens cover having lens fastener openings, and attaching the replacement light system to the upper rear facing exterior portion of the truck cab by screwing the fasteners through the lens fastener openings and the housing fastener openings and the light support member fastener openings.

The method can include the step of providing a left printed circuit board, a center printed circuit board and a right circuit board, each positioned side by side on the front side of the support member for controlling the LEDs mounted to each of the left printed circuit board and the center printed circuit board and the right circuit board.

The method can include the steps of providing a brake light operation state, and only activating the LEDs in a red color on the center printed circuit board, when a truck brake is activated.

The method can include the steps of providing a truck bed light operation state and activating all the LEDS in a white color on the left printed circuit board and the center printed circuit board and the right circuit board, when a truck bed light is activated.

The method can include the steps of providing a reverse track bed light operation state, only activating the LEDS in a white color the center printed circuit board when the truck is put in reverse travel, and changing the LEDS on the center printed circuit board from the white color to the red color when the truck brake is activated after the truck in put in the reverse travel.

Further objects and advantages of this invention will be apparent from the following detailed description of the presently preferred embodiments which are illustrated schematically in the accompanying drawings.

BRIEF DESCRIPTION OF THE FIGURES

The drawing figures depict one or more implementations in accord with the present concepts, by way of example only, not by way of limitations. In the figures, like reference numerals refer to the same or similar elements.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

Other technical advantages may become readily apparent to one of ordinary skill in the art after review of the following figures and description.

It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise specifically noted, articles depicted in the drawings are not necessarily drawn to scale.

A LIST OF COMPONENTS WILL NOW BE DESCRIBED

Figure 1:
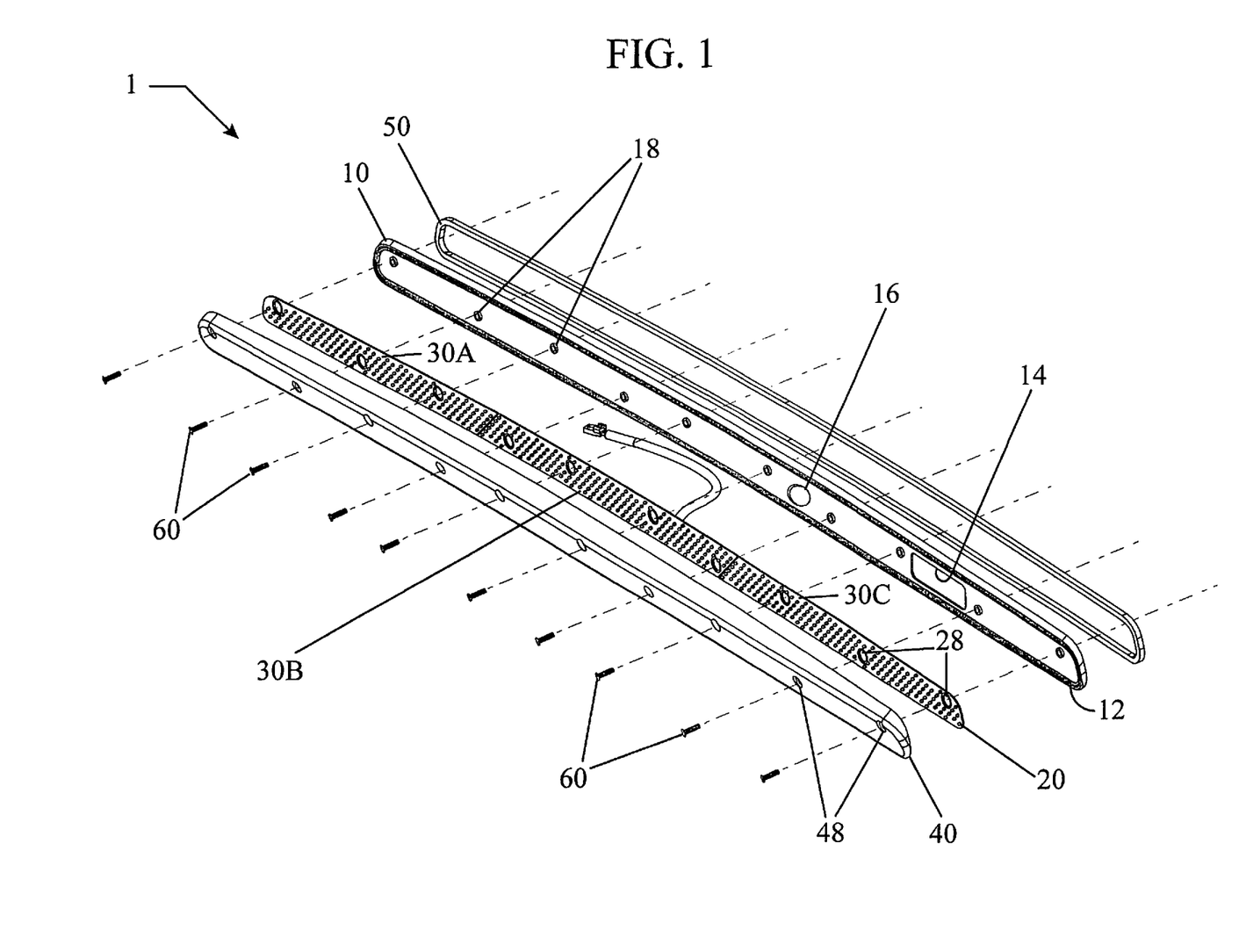
FIG. 1 is an upper front perspective exploded view of the novel replacement truck cab light system.
Figure 2:
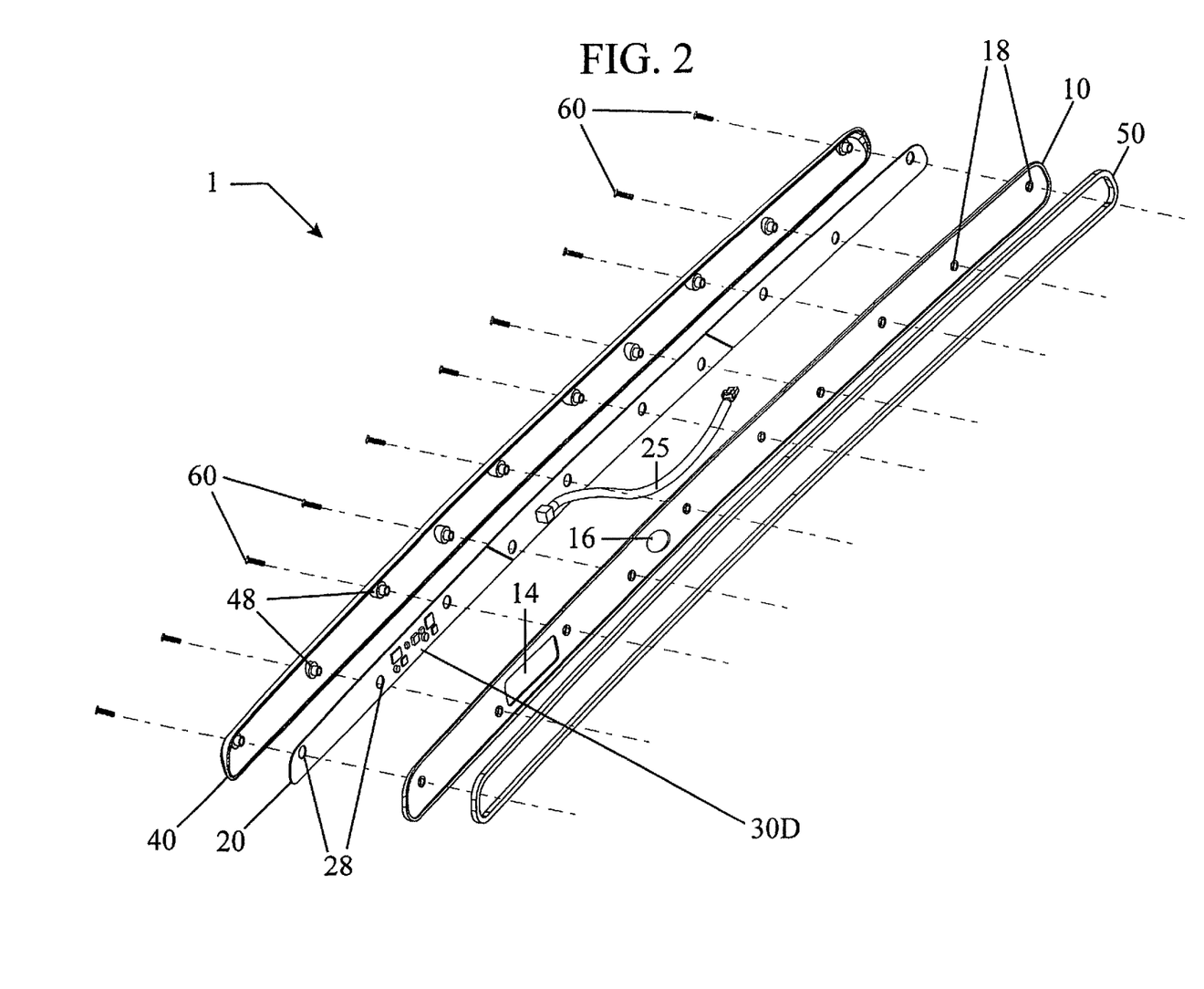
FIG. 2 is an upper rear perspective exploded view of the replacement truck cab light system of FIG. 1.

1 Replacement light system
10 elongated housing
12 raised side edges
14 additional offset from center opening for rear facing PCB
16 circular opening for wire harness
18 housing fastener holes
20 support member (elongated board)
25 wire harness 25 which includes a power cord and control lines
28 support member fastener holes
30A left printed circuit board (PCB) with color changing LEDs (light emitting diodes)
30B center printed circuit board (PCB) with color changing LEDs (light emitting diodes
30C right printed circuit board (PCB) with color changing LEDs (light emitting diodes
30D rear facing primary printed circuit board (PCB)
31 transformer
32 molex connector
33 capacitor
34 relay
35 input
36 capacitor
37 integrated circuits
40 lens cover
48 cover fastener openings
50 weather seal strip
60 fasteners
70 wiring diagram
100 Truck
110 Existing Rear Facing Brake Light
115 Existing opening(s) in back of truck cab FIG. 1 is an upper front perspective exploded view of the novel replacement truck cab light system 1. FIG. 2 is an upper rear perspective exploded view of the replacement truck cab light system 1 of FIG. 1.

Figure 3:
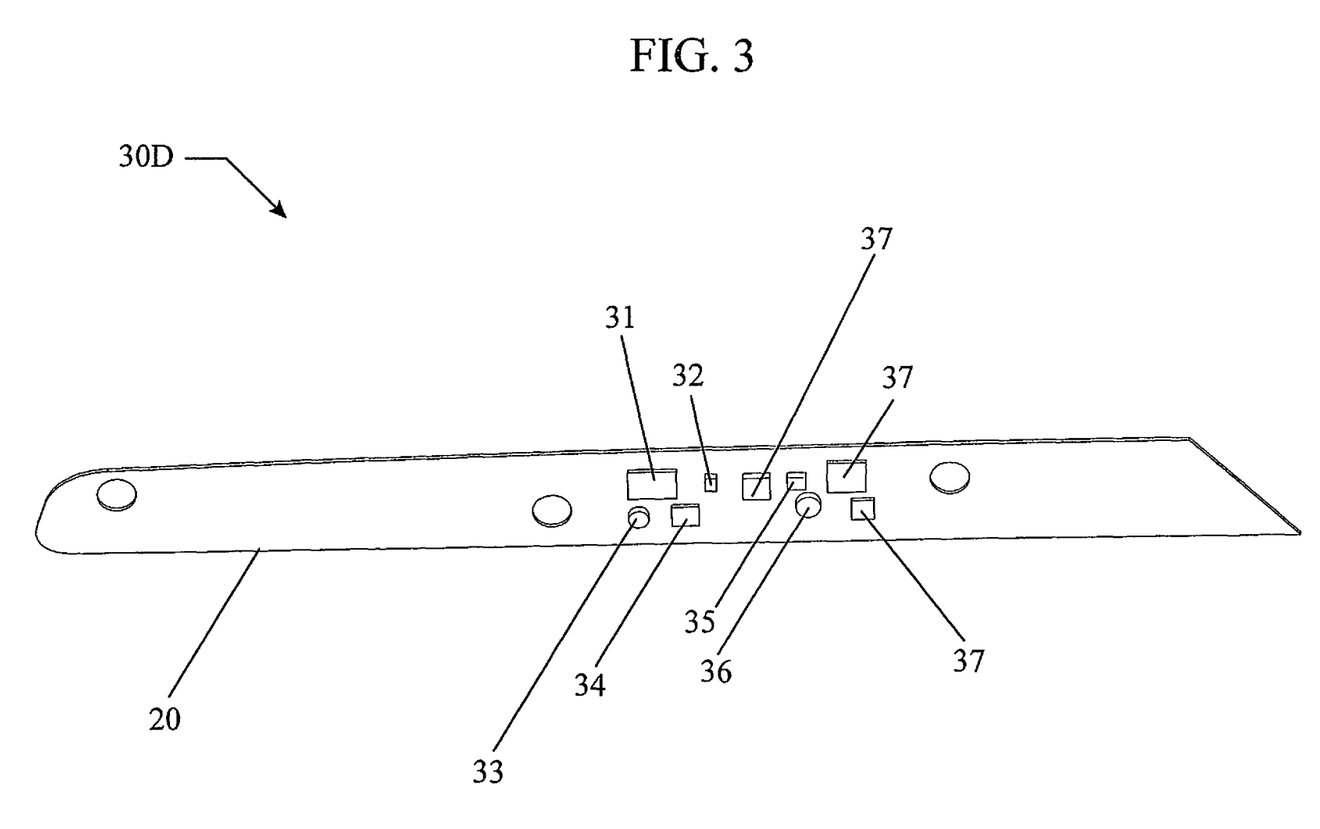
FIG. 3 is an enlarged view of one of the printed circuit boards used on the light support member shown in FIGS. 1-2.
Figure 4:
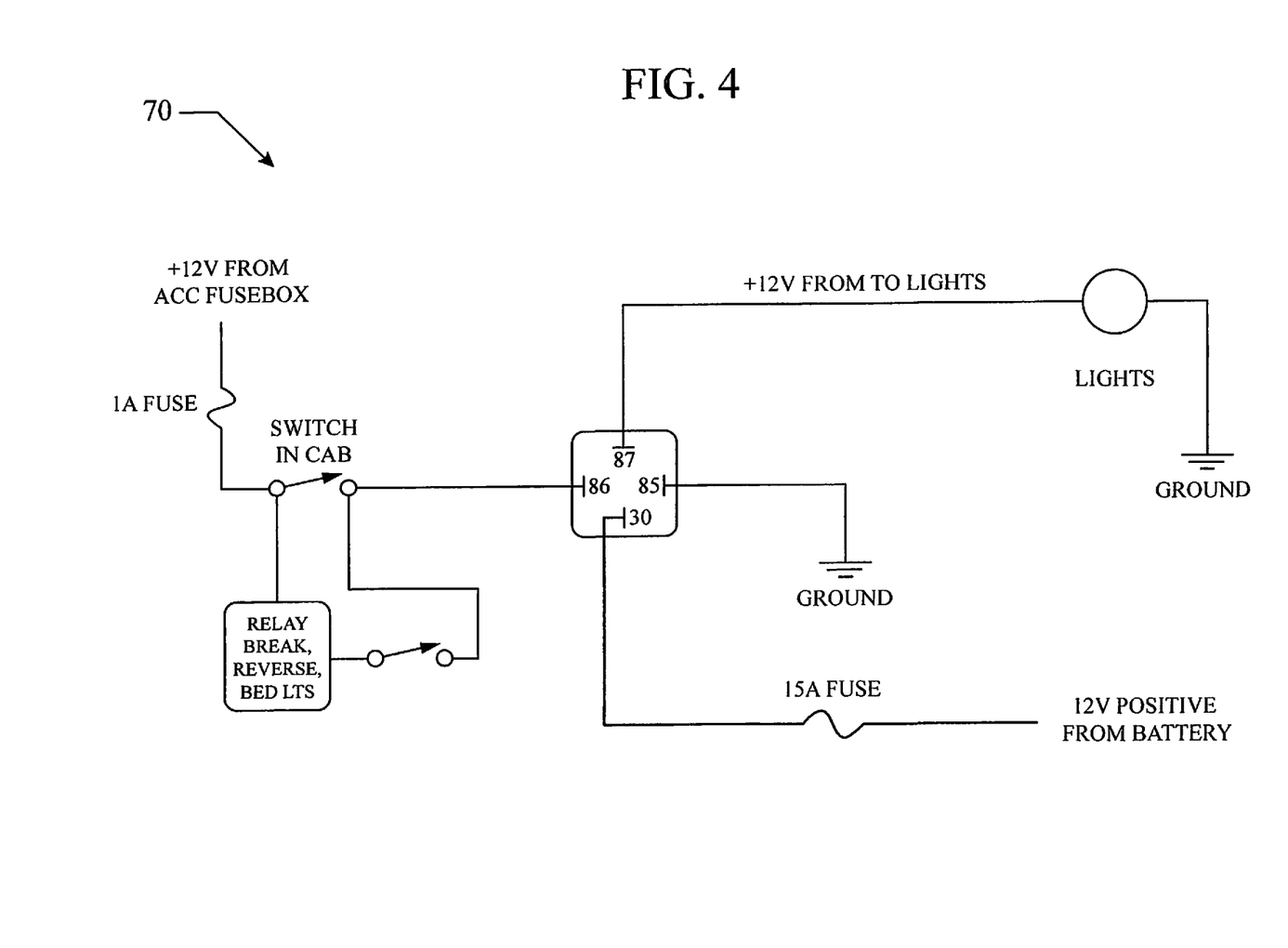
FIG. 4 is a circuit diagram for the replacement truck cab light system of FIGS. 1-2.

FIG. 3 is an enlarged view of the rearwardly facing primary printed circuit boards 30D used on the light support member 20 shown in FIGS. 1-2. The primary printed circuit board 30D can include a transformer 31, molex connector 32, capacitor 33, relay 34, input 35, capacitor 36 and integrated circuits 37 FIG. 4 is a circuit diagram 70 for the replacement truck cab light system 1 of FIGS. 1-2, that connects the LEDS (light emitting diodes) on the left printed circuit board 30A, center printed circuit board 308 and right circuit board 30C to be connected to the vehicle power supply, such as the vehicle battery through the wire harness 25.

Figure 5:
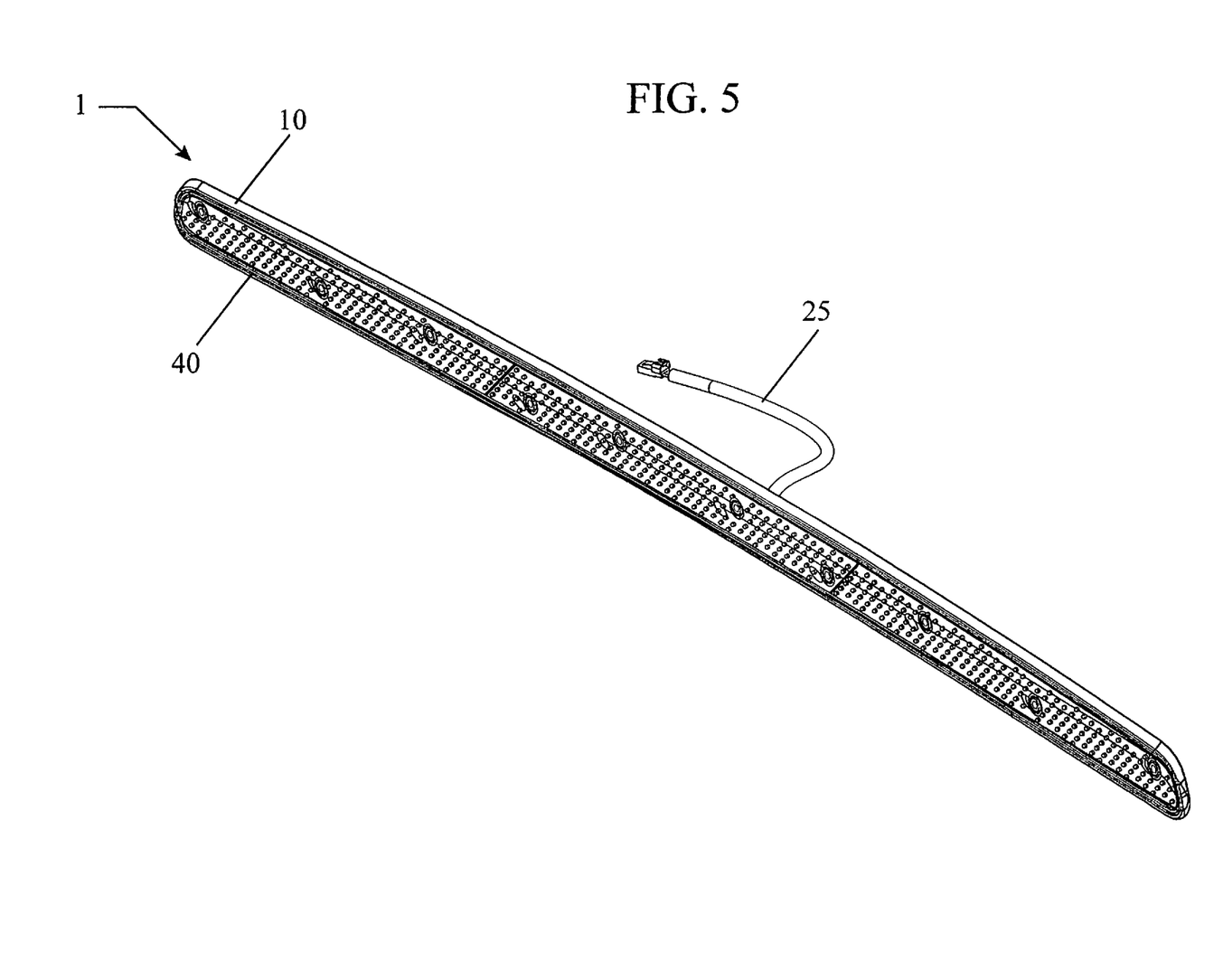
FIG. 5 is an upper front perspective view of the replacement truck cab light system of FIGS. 1-2 assembled.
Figure 6:
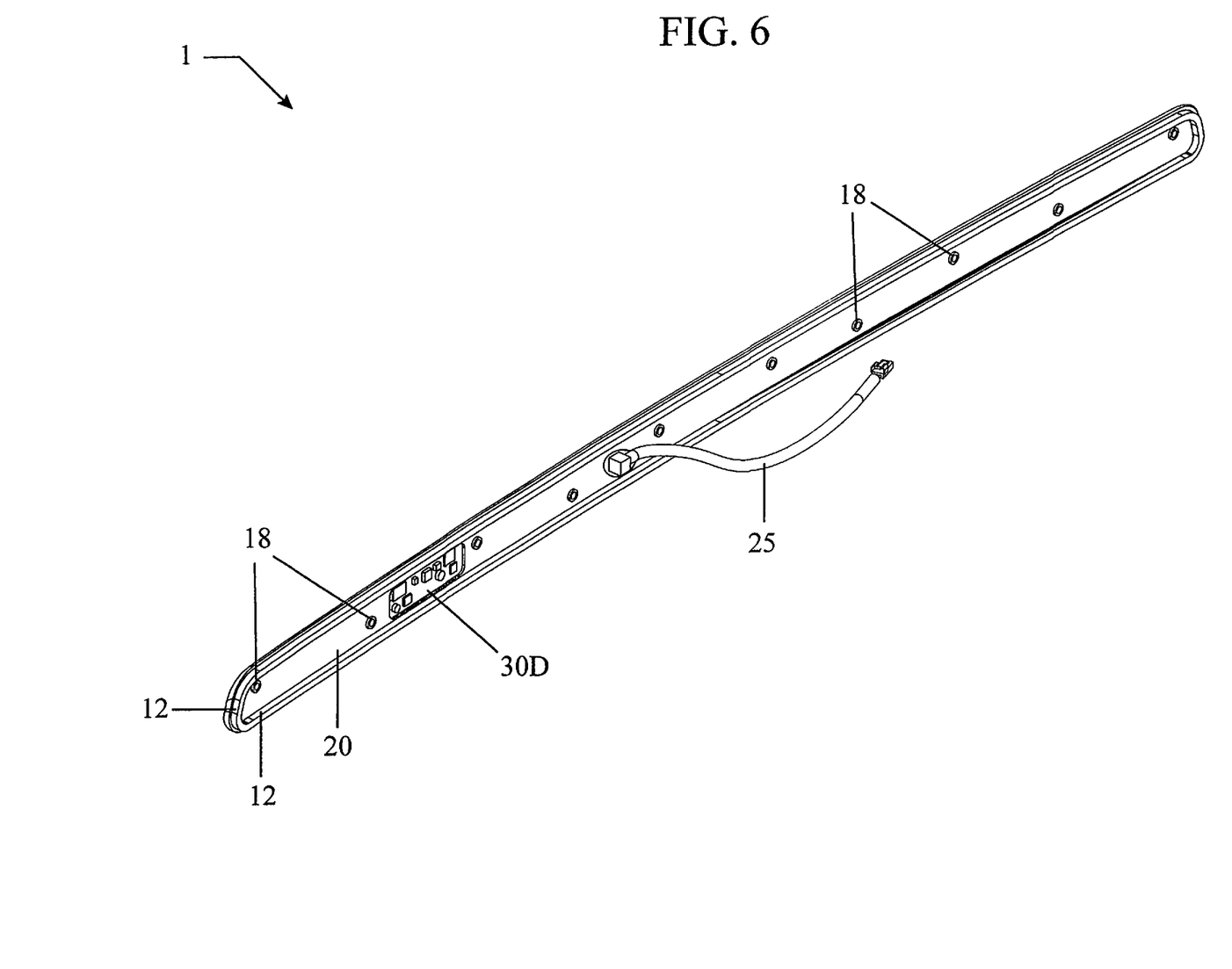
FIG. 6 is an upper rear perspective view of the assembled replacement truck cab light system of FIG. 5.
Figure 7:
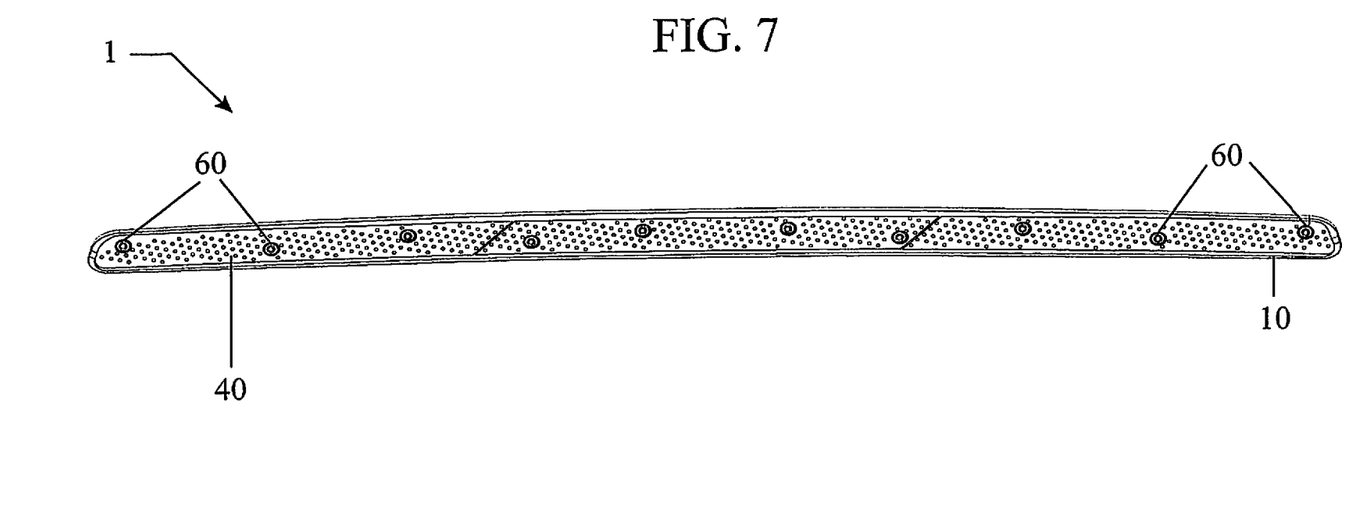
FIG. 7 is a front view of the assembled replacement truck cab light system of FIGS. 5-6.
Figure 8:
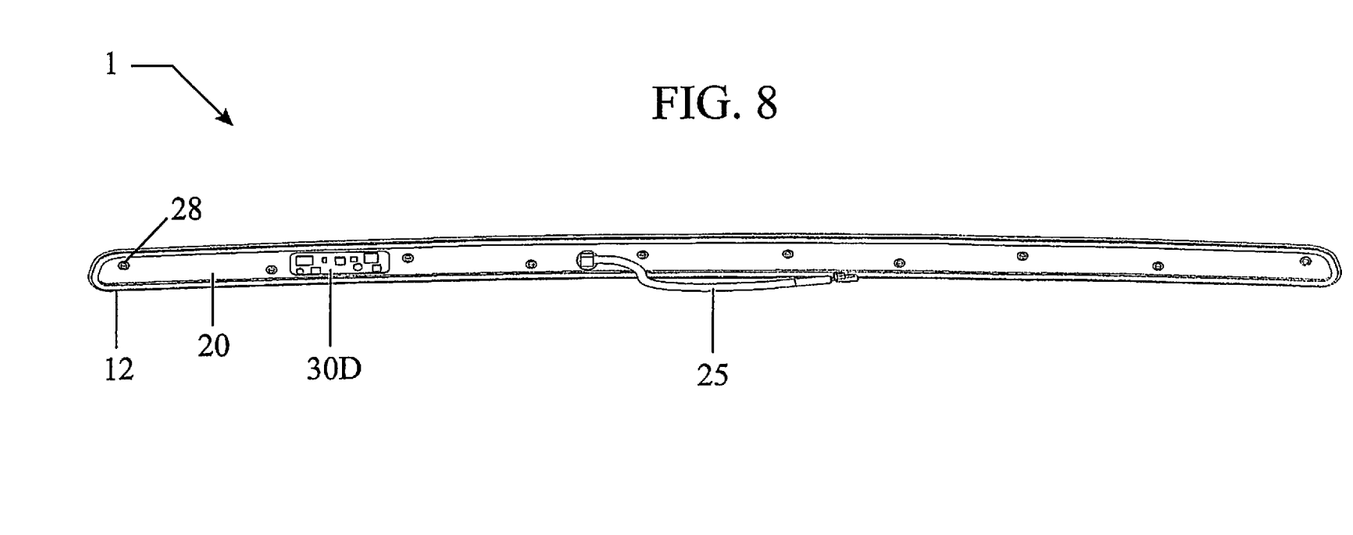
FIG. 8 is a rear view of the assembled replacement truck cab light system of FIGS. 5-6.
Figure 9:
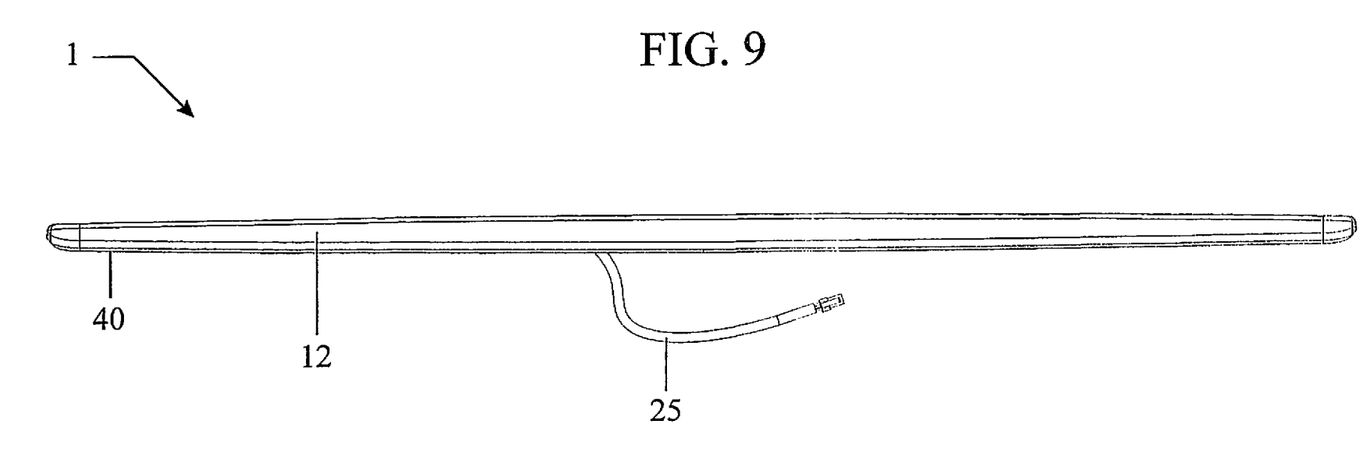
FIG. 9 is a top view of the assembled replacement truck cab light system of FIGS. 5-6.
Figure 10:
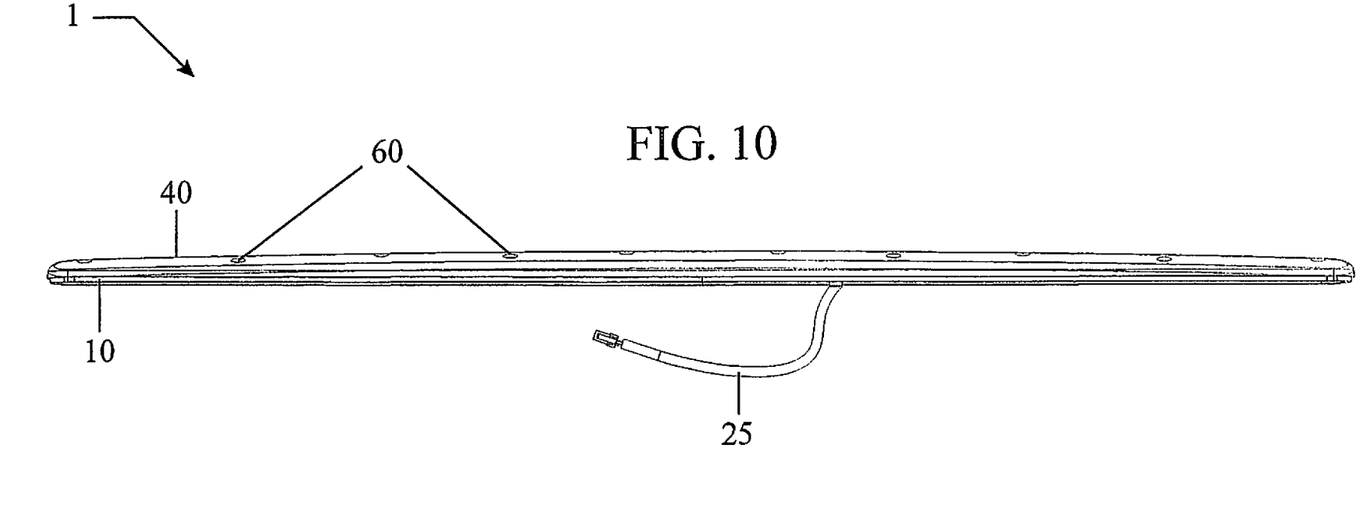
FIG. 10 is a bottom view of the assembled replacement truck cab light system of FIGS. 5-6.
Figure 11:
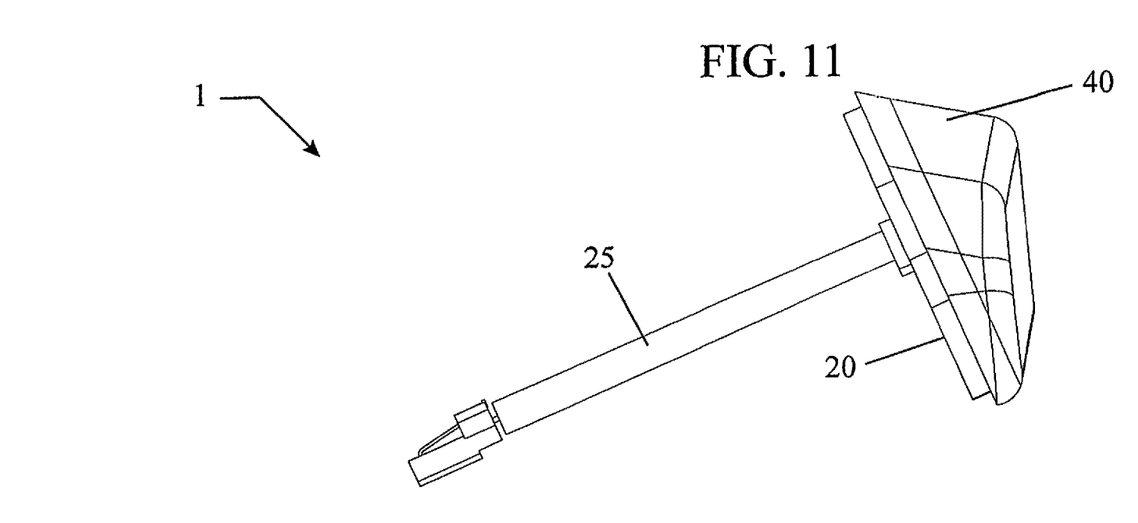
FIG. 11 is a left side view of the assembled replacement truck cab light system of FIGS. 5-6.
Figure 12:
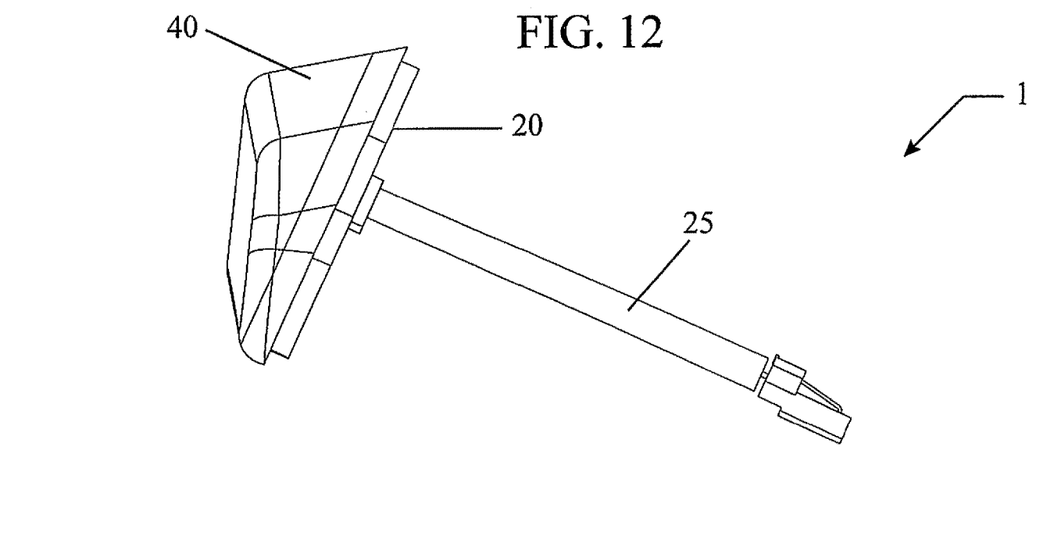
FIG. 12 is a right-side view of the assembled replacement truck cab light system of FIGS. 5-6.

FIG. 5 is an upper front perspective view of the replacement truck cab light system 1 of FIGS. 1-2 assembled. FIG. 6 is an upper rear perspective view of the assembled replacement truck cab light system 1 of FIG. 5. FIG. 7 is a front view of the assembled replacement truck cab light system 1 of FIGS. 5-6. FIG. 8 is a rear view of the assembled replacement truck cab light system 1 of FIGS. 5-6. FIG. 9 is a top view of the assembled replacement truck cab light system 1 of FIGS. 5-6. FIG. 10 is a bottom view of the assembled replacement truck cab light system 1 of FIGS. 5-6. FIG. 11 is a left side view of the assembled replacement truck cab light system 1 of FIGS. 5-6. FIG. 12 is a right-side view of the assembled replacement truck cab light system 1 of FIGS. 5-6.

Referring to FIGS. 1-12, the replacement truck cab light system 1 can include an elongated housing 10 having raised side edges 12, and a plurality of fastener holes 18 with an additional offset from center opening 14 for the rear facing primary printed circuit board 30D from the support member 20 (which will be described later in further detail) and a circular opening 16 for the wire harness 25 which includes a power cord and control lines 25, that extends from the support board 20.

Positioned on the front face of the housing 10 can be a support board 20 with a front side having a left printed circuit board (PCB) 30A with color changing LEDs (light emitting diodes) side by side with a center printed circuit board (PCB) 30B with color changing LEDs (light emitting diodes) and side by side with a right printed circuit board (PCB) 30C with color changing LEDs (light emitting diodes).

Types of color changing LEDS (light emitting diodes) used in the printed circuit boards 30A, 30B, and 30C and operation of the components in the printed circuit boards of FIG. 3 and the circuit board of FIG. 4 can include components similar to those shown and described in U.S. Published Patent Application No. 2004/0227627 to Li, and U.S. Published Patent Application No. 2014/0301101 to Russ, which are both incorporated by reference in their entirety. Additional operation of the LEDS (light emitting diodes) can be found in U.S. patent application Ser. No. 15/727,080 filed Oct. 6, 2017, now U.S. Pat. No. 10,246,006 to the same inventors and assignee as the subject patent application, which is incorporated by reference in its entirety.

Referring to FIGS. 1-12, the replacement lighting system 1 can include support member fastener holes 28 that pass through both sides of the support member 20. On the rear side of the support member 20 can be the primary printed circuit board 30D that can extend partially through the additional opening 14 that is offset from a mid-portion of the housing 10. Also, extending rearwardly from the support member 20 can be a wire harness 25 which includes a power cord and control lines for operating the LED (light emitting diodes) on the front facing side of the support member 20. The wire harness 25 can extend through a circular opening 16 in the housing and have a plug or other connection that can be connected to the vehicle power supply and control switches, and the like, for operating the replacement light system 1.

A transparent lens cover 40 can be sized to fit over the front face of the support member 20 with printed circuit boards with LEDS 30A, 30B and 30C. Fastener holes 48 in the lens cover line up with matching fastener holes 28 in the support member 20 and the housing fastener holes 18 in the housing 10.

Figure 13A:
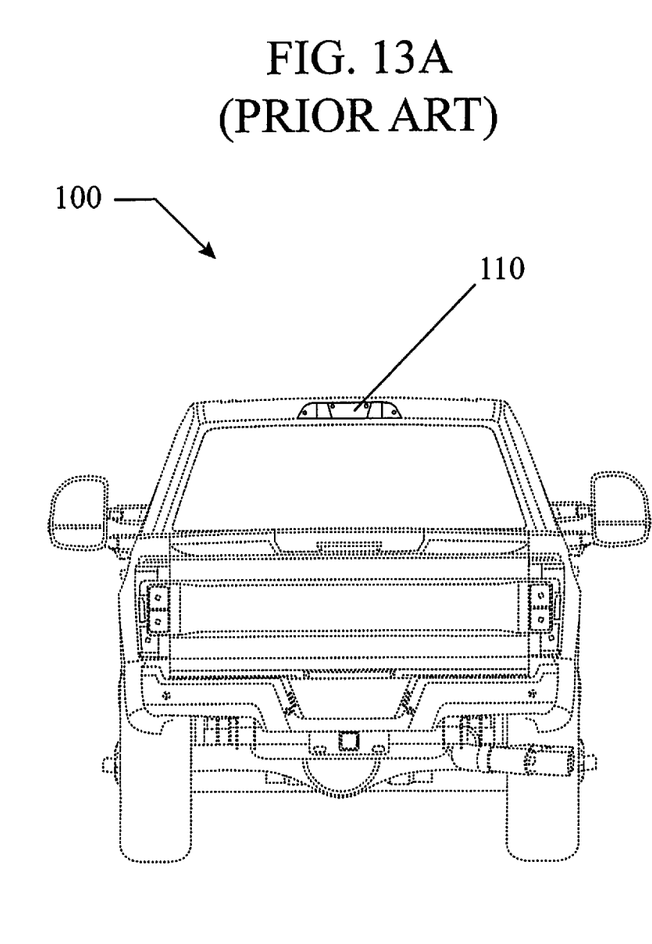
FIG. 13A is a prior art view showing the rear of truck with a factory brake light installed on the upper rear portion of a truck cab.

FIG. 13A is a prior art view showing the rear of truck 100 with a factory brake light 110 installed on the upper rear portion of a truck cab.

Figure 13B:
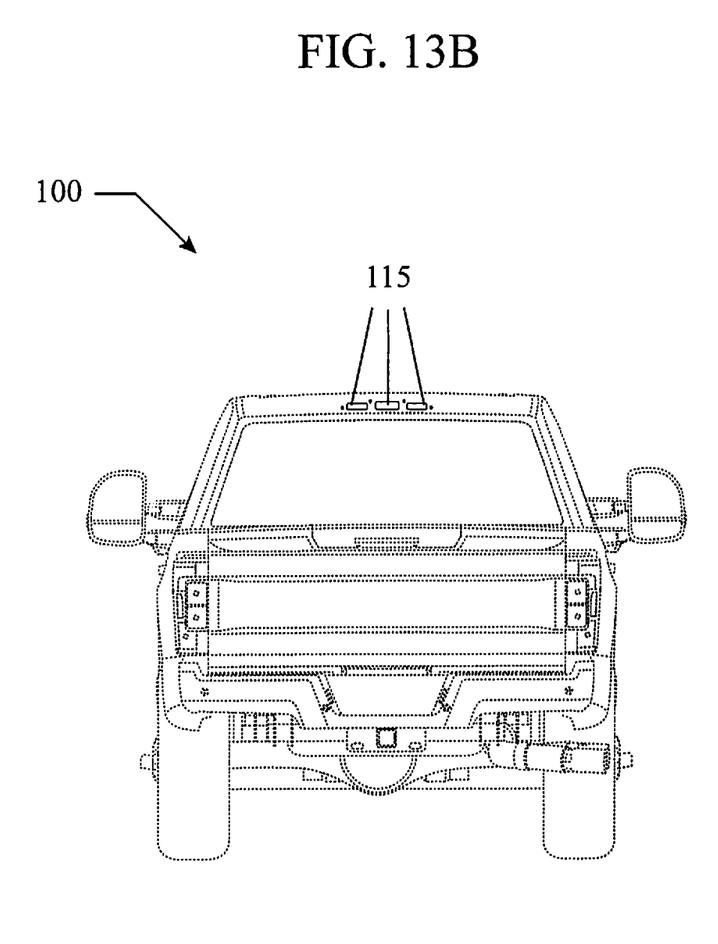
FIG. 13B is shows the factory brake light removed from the upper rear portion of the truck cab of the truck in FIG. 13A.

FIG. 13B is shows the factory brake light 110 removed from the upper rear portion of the truck cab of the truck 100 in FIG. 13A.

Figure 13C:
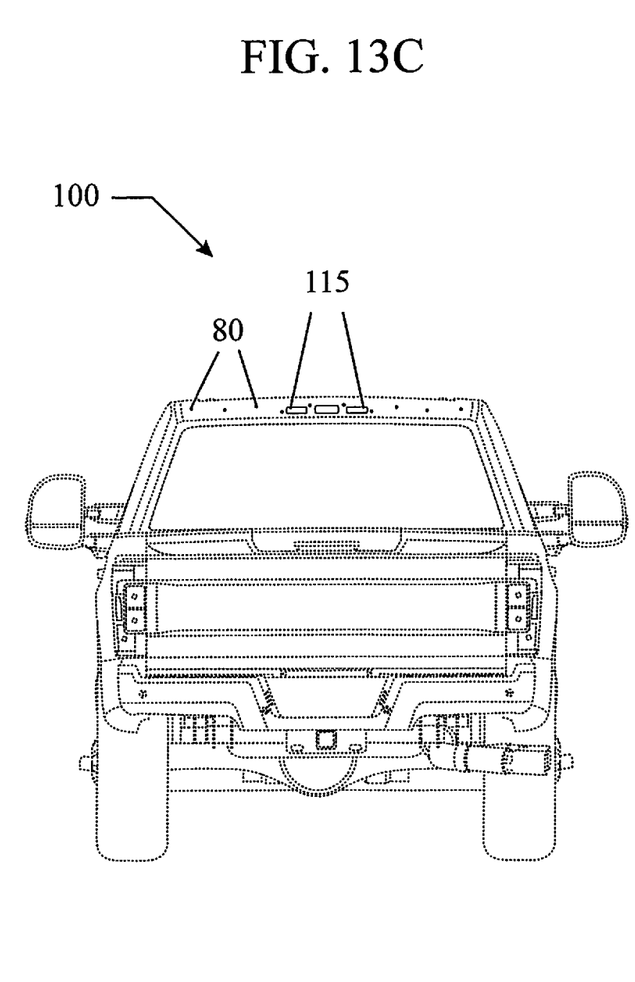
FIG. 13C is another view of the rear of the truck cab of the truck of FIG. 13B with additional fastener holes drilled into the upper rear portion of the truck cab.

FIG. 13C is another view of the rear of the truck cab of the truck 100 of FIG. 13B with additional fastener holes 80 drilled into the upper rear portion of the truck cab.

Figure 13D:
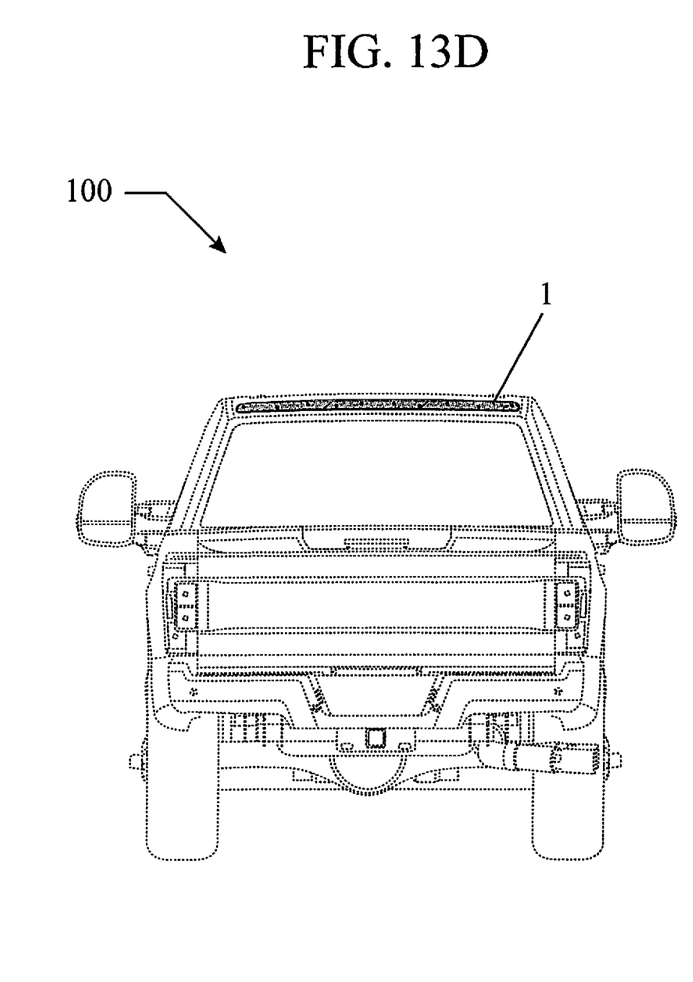
FIG. 13D shows the replacement truck light installed on the upper rear portion of the truck cab.

FIG. 13D shows the replacement truck light of the preceding FIG. 1 installed on the upper rear portion of the truck cab of the truck 100.

Figure 14:
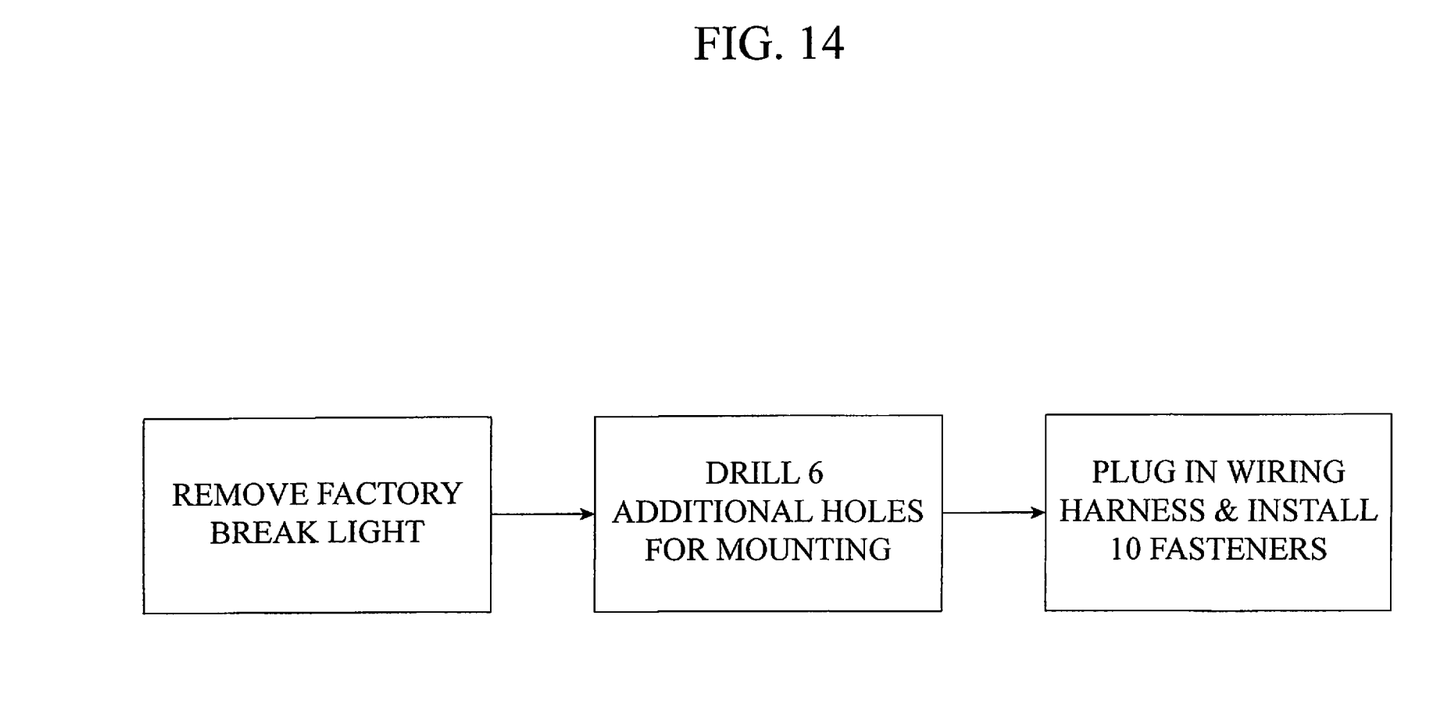
FIG. 14 shows the installation steps for removing the factory installed truck cab brake light, drilling additional fastener openings into the upper rear portion of the truck cab, and plugging in the wire harness and attaching the replacement truck light with additional fasteners.

FIG. 14 shows the installation steps for removing the factory installed truck cab brake light, drilling additional fastener openings into the upper rear portion of the truck cab, and plugging in the wire harness 25 and attaching the replacement truck light 1 with fasteners 60.

Referring to FIGS. 1-14, fasteners 60, such as but not limited to flat headed screws, and the like, can pass through the holes 48, 28 and 18, and allow for the replacement light system 1 to attach directly to the upper exterior rear portion of the truck cab. While some existing fastener openings used for attaching the factory brake light to the upper rear portion of the truck cab, the invention allows for drilling additional holes into the metal to both sides of the existing openings in the upper exterior rear portion of the truck cab. Between approximately four to approximately six or more additional holes 80 can be drilled into the upper rear exterior portion of the truck cab and allow for a more secure and uniform attachment of all of the replacement light system to the upper exterior rear portion of the truck cab. An identical number of holes 80 can be drilled on both sides of the existing openings 115 that exist. In a preferred embodiment six additional holes 80 are drilled into the upper exterior rear portion of the truck cab, with three new holes to the left side and three new holes to the right side of the existing openings 115. To seal the replacement light system 1, an elastomeric type weather strip 50 can be used and be sandwiched between a rear face of the support member 20 and the upper exterior rear portion of the truck cab.

The novel replacement light system 1 can function by having the LEDs (light emitting diodes) flash on and off, go into continuous light emissions, and use different colors, such as but not limited to red to show braking, and white for safety, and other colors and the like. The LEDS (light emitting diodes) in the left printed circuit board 30A can be separately controlled from the LEDS (light emitting diodes) 30B in the center printed circuit board 30B, and from the LEDS (light emitting diodes) 30C in the right printed circuit board 30C. Each of the three sections of LEDs in 30A, 30B, 30C can operate independently from one another, and also in uniform with one another, or other combinations with one another.

A preferred embodiment of operating the different sections of LEDS 30A, 30B and 30C will now be described.
1. When breaks are applied in the truck the center light section of LEDS 30B can emit red color.
2. When the truck is put in reverse the center LED's 30B can light up white & then red as the truck brakes are applied.
3. When a bed light switch is activated all LED's 30A, 30B and 30C comes on white.
4. When safety lights are activated (switch in cab) all LED's 30A, 30B and 30C can be activated and go into pre-programmed patterns (strobe, flash, chase, and the like)
5. If safety light is active during travel and the truck brakes are applied the center section 30B will switch to red so that the 3rd brake light function is still retained.

Other operations can allow for the left LEDS 30A and right LEDS 30C to be turn on respectively, when left and right vehicle turn signals are used and the like.

While the embodiments are primarily described for use with trucks 100, the replacement light system 1 can also be used in other applications, such as but not limited to be used with automobiles, watercraft, and the like.

The term "approximately" is similar to the term "about" and can be +/−10% of the amount referenced. Additionally, preferred amounts and ranges can include the amounts and ranges referenced without the prefix of being approximately.

Although specific advantages have been enumerated above, various embodiments may include some, none, or all of the enumerated advantages.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A brake light replacement system for a truck cab having an existing exterior facing brake light attached to an exterior face of the truck cab by existing fasteners in existing mounting openings in the truck cab, comprising:
   a brake light replacement housing having a length greater than a height, the brake light replacement housing being longer in length than the existing exterior facing brake light, the brake light replacement housing having a front side and a rear side;
   a plurality of LEDS (light emitting diodes) inside and facing from the front of the brake light replacement housing; and
   additional fasteners for attaching the brake light replacement housing to the exterior face of the truck cab, wherein the exterior facing existing brake light is removed from the exterior face of the truck cab by unfastening the existing fasteners, and is replaced by attaching the additional fasteners with or without the existing fasteners to the exterior face of the truck cab.

2. The brake light replacement system of claim 1, further comprising:
   a wire harness with power cord and control lines extending from the rear side of the brake light replacement housing for connecting the plurality of LEDs to a vehicle power supply.

3. The brake light replacement system of claim 1, wherein the brake light replacement housing, further comprises:
   an additional rear side facing opening sized to fit over a rearwardly facing printed circuit board in the brake light replacement housing.

4. The brake light replacement system of claim 3, wherein the additional rear side facing opening is offset from a middle portion on the rear side of the brake light replacement housing.

5. The brake light replacement system of claim 2, wherein the brake light replacement housing further comprises:
   a power line opening sized to receive the power line harness therethrough.

6. The brake light replacement system of claim 1, further comprising:
   an elongated lens cover sized to fit over the front side of the brake light replacement housing, the elongated lens cover having lens fastener openings.

7. The brake light replacement system of claim 1, wherein the additional fasteners include: up to approximately ten fasteners.

8. The brake light replacement system of claim 1, further comprising:
   a left printed circuit board, a center printed circuit board and a right circuit board, each positioned side by side inside of the brake light replacement housing.

9. The brake light replacement system of claim 8, further comprising:
   a brake light operation state for only activating the LEDs in a red color on the center printed circuit board, when a truck brake is activated;
   a truck bed light operation state for activating all the LEDS in a white color on the left printed circuit board and the center printed circuit board and the right circuit board, when a truck bed light is activated.

10. The brake light replacement system of claim 1, wherein the brake light replacement housing includes:
    a weather seal located about a perimeter edge of the rear side of the brake light replacement housing and the exterior face of the truck cab.

11. A method of replacing an existing exterior facing truck light attached to an exterior face of a truck cab by existing fasteners with existing mounting openings with a replacement truck light system, the method comprising the steps of:
    providing a brake light replacement housing having a length greater than a height, the brake light replacement housing longer in length than the existing exterior facing brake light, the brake light replacement housing having a front side and a rear side;
    providing a plurality of LEDS (light emitting diodes) in the front side of the brake light replacement housing; and
    providing additional fasteners,
    removing the existing exterior facing truck light from the exterior face of the truck cab; and
    mounting the brake light replacement housing to the exterior face of the truck cab with the additional fasteners and with or without the existing fasteners.

12. The method of claim 11, wherein the mounting step includes the step of:
    drilling additional fastener openings into the exterior face of the truck cab.

13. The method of claim 12, wherein the drilling step includes the step of:
    drilling up to approximately six additional fastener openings into the exterior face of the truck cab.

14. The method of claim 13, wherein the drilling step includes the step of:
    drilling six additional fastener openings into the exterior face of the truck cab.

15. The method of claim 11, further comprising the steps of:
    providing an elongated lens cover sized to fit over the front side of the brake light replacement housing, the lens for allowing for light from the plurality of the LEDS to be visible therethrough.

16. The method of claim 11, further comprising the steps of:
    providing a left printed circuit board, a center printed circuit board and a right circuit board, inside of the brake light replacement housing.

17. The method of claim 16, further comprising the steps of:
    providing a brake light operation state; and
    only activating the LEDs in a red color on the center printed circuit board, when a truck brake is activated.

18. The method of claim 17, further comprising the steps of:
    providing a truck bed light operation state; and
    activating all the LEDS in a white color on the left printed circuit board and the center printed circuit board and the right circuit board, when a truck bed light is activated.

19. The method of claim 18, further comprising the step of:

providing a reverse track bed light operation state;

only activating the LEDS in a white color the center printed circuit board when the truck is put in reverse travel; and changing the LEDS on the center printed circuit board from the white color to the red color when the truck brake is activated after the truck in put in the reverse travel.

20. A brake light replacement device for a truck cab having an existing exterior facing brake light attached an exterior face of the truck cab, comprising:

a brake light replacement housing being longer in length than the existing exterior facing brake light, and having a front side and a rear side; and a plurality of LEDS (light emitting diodes) in the brake light replacement housing, wherein the rear side of the brake light replacement housing is attached to the exterior face of the truck cab by attaching fasteners into the brake light replacement housing to the exterior face of the truck cab.

\* \* \* \* \*